(12) United States Patent
Morimoto et al.

(10) Patent No.: US 8,092,740 B2
(45) Date of Patent: Jan. 10, 2012

(54) METHOD OF MANUFACTURING A POROUS MATERIAL

(75) Inventors: Kenji Morimoto, Kasugai (JP); Katsuhiro Inoue, Ama-Gun (JP)

(73) Assignee: NGK Insulators, Ltd., Nagoya (JP)

( * ) Notice: Subject to any disclaimer, the term of this patent is extended or adjusted under 35 U.S.C. 154(b) by 192 days.

(21) Appl. No.: 12/249,129

(22) Filed: Oct. 10, 2008

(65) Prior Publication Data

US 2009/0065982 A1 Mar. 12, 2009

Related U.S. Application Data

(62) Division of application No. 10/508,611, filed as application No. PCT/JP03/03859 on Mar. 27, 2003, now Pat. No. 7,473,464.

(30) Foreign Application Priority Data

Mar. 29, 2002 (JP) .................................. 2002-096805

(51) Int. Cl.
*B28B 3/20* (2006.01)
(52) U.S. Cl. ........................................ 264/631; 264/630
(58) Field of Classification Search .................. 264/630, 264/631
See application file for complete search history.

(56) References Cited

U.S. PATENT DOCUMENTS

| | | | |
|---|---|---|---|
| 1,978,691 A | 10/1934 | Phelps | |
| 4,632,683 A | 12/1986 | Fukutani et al. | |
| 4,698,317 A | 10/1987 | Inoue et al. | |
| 4,871,693 A | 10/1989 | Inoue et al. | |
| 4,937,210 A | 6/1990 | Jones et al. | |
| 5,853,444 A | 12/1998 | Maier et al. | |
| 6,254,963 B1 | 7/2001 | Kondo | |
| 6,582,796 B1 | 6/2003 | Joulin et al. | |
| 6,736,875 B2 | 5/2004 | Gadkaree et al. | |
| 6,773,481 B2 | 8/2004 | Noguchi et al. | |
| 6,815,038 B2 | 11/2004 | Morimoto et al. | |
| 7,037,477 B2 | 5/2006 | Tomita et al. | |
| 7,250,384 B2 | 7/2007 | Morimoto et al. | |
| 7,691,319 B2 * | 4/2010 | Inoue ........................... | 264/630 |
| 2003/0110744 A1 | 6/2003 | Gadkaree et al. | |
| 2003/0148063 A1 | 8/2003 | Morimoto et al. | |
| 2005/0158534 A1 | 7/2005 | Tabuchi et al. | |
| 2007/0063397 A1 | 3/2007 | Inoue | |

FOREIGN PATENT DOCUMENTS

| | | |
|---|---|---|
| EP | 1 125 704 A1 | 8/2001 |
| JP | 03-010365 B2 | 2/1991 |
| JP | 05-213665 A1 | 8/1993 |
| JP | 06-116059 A1 | 4/1994 |
| JP | 06-182228 A1 | 7/1994 |
| JP | 09-077572 A1 | 3/1997 |
| JP | 11-253722 A1 | 9/1999 |
| JP | 2000-351679 A1 | 12/2000 |
| JP | 2001-206785 A1 | 7/2001 |
| JP | 2001-261463 A1 | 9/2001 |
| JP | 2002-326881 A1 | 11/2002 |
| WO | WO 99/28690 | 6/1999 |

* cited by examiner

*Primary Examiner* — Matthew Daniels
*Assistant Examiner* — Russell Kemmerle, III
(74) *Attorney, Agent, or Firm* — Burr & Brown

(57) ABSTRACT

A porous material is provided, including a connected structure formed by combining silicon carbide aggregate particles with cordierite, which is a combining material in a state to hold a large number of pores, and having a porosity of 52 to 70% and a median pore diameter of 15 to 30 μm. The porous material has a high porosity and a high strength and has a remarkably low possibility of including defective portions, such as cuts and the like which cause liquid leakage when the material is used as a filter.

4 Claims, No Drawings

METHOD OF MANUFACTURING A POROUS MATERIAL

CROSS REFERENCE TO RELATED APPLICATIONS

This application is a division of U.S. application Ser. No. 10/508,611, filed Sep. 23, 2004, which was the National Stage of International Application No. PCT/JP03/03859, filed Mar. 27, 2003, the entireties of which are incorporated herein by reference.

FIELD OF THE INVENTION

The present invention relates to a porous material having characteristics which are preferable for a material constituting a filter, a catalyst carrier or the like mainly for purifying automobile exhaust gas, and a method of manufacturing the porous material.

BACKGROUND OF THE INVENTION

A porous honeycomb structure comprising: cell partition walls (ribs) forming a compound body of a plurality of cells adjacent to one another; and a honeycomb outer wall which surrounds and holds an outermost peripheral cell positioned in an outermost periphery of the cell compound body has been broadly used as a filter (diesel particulate filter (DPF)) for trapping/removing particulate matters contained in a dust-containing fluid such as a diesel engine exhaust gas, or a catalyst carrier for carrying a catalyst component which purifies toxic substances in an exhaust gas. As constituting materials, fire-resistant silicon carbide (SiC), cordierite and the like, or a compound material of these materials and the like are used.

Moreover, development of the DPF (DPF for regenerating a catalyst) has progressed adopting a regenerating system in which an oxide catalyst is carried by a conventional DPF, and deposited particulates are oxidized, burnt, and continuously regenerated.

As this honeycomb structure, for example, a porous silicon carbide catalyst carrier having a honeycomb structure has been described which is obtained, for example, by using a silicon carbide powder having a predetermined specific surface area and containing impurities as a starting raw material, forming this material into a desired shape, and drying and thereafter firing the material in a temperature range of 1600 to 2200° C. (Japanese Patent Application Laid-Open No. 6-182228).

Moreover, concerning the material constituting the honeycomb structure, for example, a cordierite compound material has been described which contains a cordierite matrix and a predetermined amount of sheet-like silicon carbide and which has a high strength at a high temperature and which is superior in creep characteristics (Japanese Patent No. 3065421).

In a sintering configuration (necking) by re-crystallization reaction of the silicon carbide powder itself in the catalyst carrier described in the Japanese Patent Application Laid-Open No. 6-182228, a silicon carbide component evaporates from the surfaces of silicon carbide particles, this component condenses in a contact portion (neck portion) between the particles, accordingly the neck portion grows, and a bonded state is obtained. However, since a very high firing temperature is required in order to evaporate silicon carbide, this raises costs. Moreover, since a material having a high coefficient of thermal expansion has to be fired at a high temperature, there has been a problem that a firing yield drops. When a high-porosity filter, especially a filter having a porosity of 50% or more is manufactured by the firing by the re-crystallization reaction of the above-described silicon carbide powder itself, the firing mechanism does not sufficiently function, therefore the growth of the neck portion is inhibited, and this has caused a problem that the strength of the filter drops. Furthermore, the above-described material is advantageous in that thermal conductivity is very high at 30 W/m·K or more and local heating is suppressed. However, when the material is used in the DPF for regenerating the catalyst, because of characteristics that a deposited amount of particulates is small and the material easily emits heat, a long time is required until temperature of the carrier rises, and a long time is required until the temperature is raised at a temperature at which the catalyst functions. Therefore, there has also been a problem that the particulates remain unburnt and regeneration efficiency drops.

It is to be noted that with regard to the DPF, it is one of important problems to reduce pressure losses largely influencing engine outputs as much as possible. To achieve the problem, it has been demanded that the DPF be set to a higher porosity, that is, a material having a higher porosity be used as a porous material constituting this filter. Concerning the DPF for regenerating the catalyst, it has been demanded that the pressure loss of the filter be suppressed as much as possible. It has also been demanded that a higher porosity, concretely a porosity of 50% or more, especially around 70% be set.

However, the porosity of the cordierite compound material described in the above-described Japanese Patent No. 3065421 is in a range of 0% (dense) to 50% (porous), and the material has not been satisfactory as the material constituting the DPF for regenerating the catalyst. Furthermore, the cordierite compound material described in the Japanese Patent No. 3065421 exerts a certain effect in enhancing creep characteristics or resistance to shock, but has a small content of silicon carbide, and has not been necessarily sufficiently satisfactory in respect of thermal conductivity or chemical durability.

As a method of constituting the honeycomb structure into the high porosity, there has heretofore been a method in which pore formers such as starch and foam resin are added to a raw material mixture of a porous material constituting this honeycomb structure and containing silicon carbide particles and the like, and these pore formers are burnt/flied at a firing time. However, to set the porosity to be not less than a certain degree, for example, 60% or more, an amount of pore formers to be added increases. When a large amount of organic compound based pore formers are added, amounts of organic volatile substances and gases such as carbon dioxide generated in a degreasing (calcining) stage also increase, and combustion heat also increases. Defective portions such as cracks, tears and cuts, that is, defective portions which do not exert a filter function and in which leakage of a fluid occurs are sometimes formed in a calcined (degreased) body or a fired body obtained on this preparation condition.

The present invention has been developed in consideration of the problems of the conventional techniques, and an object thereof is to provide a porous material which has a high porosity and a high strength and which has a remarkably low possibility of including defective portions such as cuts causing liquid leakage in a case where the material is used as a filter, and a method of manufacturing the porous material having the characteristics.

SUMMARY OF THE INVENTION

That is, according to the present invention, there is provided a porous material comprising: a connected structure formed by combining silicon carbide which is in the form of aggregate particles with cordierite which is a combining material in a state to hold a large number of pores, characterized in that the material has a porosity of 52 to 70% and a median pore diameter of 15 to 30 μm.

In the present invention, a ratio of a content of silicon carbide to a total content of cordierite and silicon carbide is preferably 5 to 70% by volume, and a ratio of a volume of pores each having a diameter of 50 μm or more to a total volume of pores is preferably 10% by volume or less. In the present invention, a median particle diameter of silicon carbide is preferably 10 to 50 μm.

Moreover, according to the present invention, there is provided a method of manufacturing a porous material using silicon carbide which is in the form of aggregate particles, and a cordierite forming material containing an Al source, an Si source, and an Mg source and forming cordierite by firing, characterized in that an inorganic micro balloon containing $SiO_2$ and $Al_2O_3$ is used as a part or all of the Al source and the Si source.

In the present invention, a total content of the Si source and the Al source contained in the inorganic micro balloon with respect to the whole inorganic micro balloon is preferably 90% by mass or more, when the Si source is converted to $SiO_2$, and the Al source is converted to $Al_2O_3$, and a total content of a sodium compound and a potassium compound contained in the inorganic micro balloon with respect to the whole inorganic micro balloon is preferably 2% by mass or less, when the sodium compound is converted to $Na_2O$, and the potassium compound is converted to $K_2O$.

In the present invention, a melting point of the inorganic micro balloon is 1400° C. or more, and $Mg(OH)_2$ and/or $MgCO_3$ is preferably used as a part or all of the Mg source. In the present invention, silicon carbide is preferably spherical, and has a median particle diameter of 10 to 50 μm.

DETAILED DESCRIPTION OF THE INVENTION

An embodiment of the present invention will be described hereinafter, but it should be understood that the present invention is not limited to the following embodiment, and modifications, improvements and the like of designs are added based on usual knowledge of a person skilled in the art without departing from the scope of the present invention.

In the present invention, there is provided a porous material comprising: a connected structure formed by combining silicon carbide which is in the form of aggregate particles with cordierite which is a combining material in a state to hold a large number of pores, characterized in that the material has a porosity of 52 to 70% and a median pore diameter of 15 to 30 μm. Details will be described hereinafter.

The porous material of the present invention is formed of a connected structure containing silicon carbide which is in the form of aggregate particles, and cordierite which is the combining material for combining silicon carbide and whose melting point is comparatively low, and therefore the material can be sintered at a comparatively low firing temperature at a manufacturing time, a manufacturing cost can be suppressed, and a yield can be enhanced.

Moreover, the connected structure constituting the porous material of the present invention has a large number of pores. Furthermore, the porous material of the present invention is a porous body having a porosity of 52 to 70% and a median pore diameter of 15 to 30 μm. Therefore, in a case where a DPF, a DPF for regenerating a catalyst, or the like is prepared using this material, pressure losses of these filters can be lowered, and particulate substances contained in a dust-containing fluid can be efficiently trapped/removed.

When the porosity is less than 52%, or the median particle diameter is less than 15 μm, the porous or the median particle diameter required for the porous material constituting the DPF, the DPF for regenerating the catalyst or the like cannot be satisfied. When the porosity exceeds 70%, or the median particle diameter exceeds 30 μm, strength drops, and therefore durability of the material of the DPF, the DPF for regenerating the catalyst or the like is unfavorably insufficient. It is to be noted that from viewpoints of sufficient durability of the material of the DPF, the DPF for regenerating the catalyst or the like, achievement of a high trapping efficiency, and reduction of the pressure loss, the porosity is preferably 52% to 70%, and the median particle diameter is 15 to 30 μm, and the porosity is further preferably 60 to 70%, and the median particle diameter is 15 to 25 μm.

Moreover, since an appropriate ratio (hereinafter referred to as "the silicon carbide content ratio") of a content of silicon carbide to a total content of cordierite and silicon carbide constituting the porous material of the present invention fluctuate by a shape or a size, an optimum value cannot be necessarily unequivocally determined, but the range is preferably 5 to 70% by volume, farther preferably 10 to 60% by volume, and especially preferably 20 to 50% by volume. When the ratio is less than 5% by volume, the material is sometimes insufficient in thermal conductivity and chemical durability. On the other hand, when the ratio exceeds 70% by volume, the content of cordierite as the combining material runs short, advantages cannot be sufficiently utilized, the material does not have a sufficiently low thermal expansion, and has an insufficient mechanical strength, and costs sometimes increase.

The connected structure constituting the porous material of the present invention has a large number of pores, and a ratio (hereinafter referred to as "the 50 μm or larger pore ratio") of a volume of pores each having a diameter of 50 μm or more to a total volume of pores is preferably 10% by volume or less, farther preferably 9% by volume or less, especially preferably 8% by volume or less. That is, since an occupying ratio of pores having comparatively large diameters in the connected structure is small, and the tissue entirely has a large number of pores having small diameters, and therefore the tissue has a characteristic such as a high strength.

When the 50 μm or larger pore ratio exceeds 10% by volume, for example, the strength of the DPF prepared using the porous material unfavorably drops in some case. It is to be noted that a lower limit of the 50 μm or larger pore ratio is not especially limited, but the tissue may not have any 50 μm or larger pores.

Moreover, in the present invention, a median particle diameter of silicon carbide is preferably 10 to 50 μm, further preferably 20 to 40 μm, and especially preferably 20 to 35 μm. When the median particle diameter of the silicon carbide is less than 10 μm, a value of the median particle diameter is excessively small (<15 μm), and therefore the median particle diameter required for the material of the DPF, the DPF for regenerating the catalyst or the like cannot be satisfied. When the median particle diameter exceeds 50 μm, the strength drops because the 50 μm or larger pore ratio is excessively large (>10%). The durability of the material of the DPF, the DPF for regenerating the catalyst or the like is unfavorably insufficient. It is to be noted that the median particle diameter of silicon carbide refers to a value measured by a laser diffraction/scattering type grain size distribution measuring instrument with regard to a raw material. With regard to a fired body, a maximum value (A) of an interval of parallel lines at a time when two parallel lines hold one silicon carbide particle therebetween in such a manner as to contact an outer peripheral portion of the particle in a 500 times SEM photograph of a polished section, and an interval (B) of the parallel lines at a time when two parallel lines crossing the two parallel lines indicating the maximum value (A) at right angles, respectively, hold the silicon carbide particle therebetween in such a manner as to contact the outer peripheral portion of the particle are measured. An average value of A and B is obtained with respect to all the silicon carbide particles in an SEM photograph view field, and the obtained average value is the median particle diameter.

Next, a method of manufacturing the porous material of the present invention will be described. In the method of manufacturing the porous material of the present invention, silicon carbide which is in the form of aggregate particles, and a cordierite forming material containing an Al source, an Si source, and an Mg source and forming cordierite by firing are used. In this case, an inorganic micro balloon containing $SiO_2$ and $Al_2O_3$ is used as a part or all of the Al source and the Si source. Details will be described hereinafter.

The inorganic micro balloon for use in the present invention indicates a function of a pore former. This inorganic micro balloon has a low specific weight and an appropriate strength as compared with an organic compound based pore former which has heretofore been used, and therefore the balloon is not easily crushed at a mixing/kneading time, and is easily handled. Since the inorganic micro balloon fulfils a function of aggregate particles which appropriately holds a structure of a formed body before firing, shrinkage of the formed body during the firing can be suppressed. Furthermore, the inorganic micro balloon is fired to thereby react with the Mg source and the like contained in the cordierite forming material, and forms cordierite. That is, bubbles of the inorganic micro balloon form a porous structure, and therefore a high-porosity porous material which exerts a superior pore forming effect can be manufactured.

It is to be noted that the inorganic micro balloon for use in the present invention does not generate any gas component even when actually fired. Therefore, an effect is produced that defective portions such as cracks, tears and cuts are not easily generated in the obtained porous material.

In the present invention, a total content of the Si source and the Al source contained in the inorganic micro balloon with respect to the whole inorganic micro balloon is preferably 90% by mass or more, further preferably 95% by mass or more, and especially preferably 98% by mass or more, when the Si source is converted to $SiO_2$, and the Al source is converted to $Al_2O_3$. When the total content of the Si and Al sources is less than 90% by mass, a grass phase is generated, and the material is unfavorably easily softened at a lower temperature. It is to be noted that an upper limit value of the content is not especially limited, and theoretically a higher content is preferable.

In the present invention, a total content of a sodium compound and a potassium compound contained in the inorganic micro balloon with respect to the whole inorganic micro balloon is preferably 2% by mass or less, further preferably 1% by mass or less, especially preferably 0.5 by mass or less, when the sodium compound is converted to $Na_2O$, and the potassium compound is converted to $K_2O$. The sodium compound and the potassium compound contained in the inorganic micro balloon are so-called impurities as viewed from the Si and Al sources ($SiO_2$ and $Al_2O_3$) similarly contained in the balloon, and therefore the inorganic micro balloon containing large amounts of these compounds has a low melting point. That is, in the case of use of the inorganic micro balloon (e.g., Shirasu-balloon, etc.) in which the total content of the sodium and potassium compounds contained as the impurities when converted to $Na_2O$ and $K_2O$, respectively, exceeds 2% by mass, when the firing is performed at around 1420° C., the balloon is quickly and easily molten, the obtained porous material shrinks, and unfavorably the pore forming effect is not exerted well. It is to be noted that a lower limit value of the content is not especially limited, and theoretically a lower content is preferable.

In the present invention, a melting point of the inorganic micro balloon is 1400° C. or more, further preferably 1450° C. or more, and especially preferably 1500° C. or more. When the melting point of the inorganic micro balloon is less than 1400° C., for example, in the case of the firing at around 1420° C., the balloon is quickly and easily molten, the obtained porous material shrinks, and unfavorably the pore forming effect is not exerted well. It is to be noted that an upper limit value of the melting point is not especially limited in the present invention, but the point may be 1700° C. or less from viewpoints that the balloon effectively functions as aggregate particles and the high-porosity porous material is formed. Concrete examples of the inorganic micro balloon which is preferably used in the present invention and which satisfies the above-described various conditions include fly ash balloons (coal ash) generated as wastes in a thermal power station or the like. It is to be noted that the fly ash balloon is also preferable in that the wastes can be effectively utilized.

In the present invention, the median particle diameter of the inorganic micro balloon is preferably 100 µm or less, because a honeycomb having a partition wall thickness of 300 µm or less can be extruded. The median particle diameter is a value measured by a laser diffraction/scattering type grain size distribution measuring instrument. A compression strength calculated assuming that the inorganic micro balloon is a solid sphere is preferably 1 MPa or more, because the balloon is not easily crushed at a kneading time. The compression strength is a value measured using a micro compression tester. Furthermore, a tap filling density of the inorganic micro balloon is preferably 0.4 g/cm³ or less, and a thickness of a shell is preferably 10 µm or less, further preferably 5 µm or less. It is to be noted that the thickness of the shell is a value measured by observation of a broken or polished face of the shell with a microscope. Concrete examples of the inorganic micro balloon satisfying these conditions include E-SPHERES SL-75 (manufactured by ENVIROSPHERES Co.), but the present invention is not limited to these concrete examples.

In the present invention, $Mg(OH)_2$ and/or $MgCO_3$ is preferably used as a part or all of the Mg source contained in the cordierite forming material. $Mg(OH)_2$ and/or $MgCO_3$ exhibits an effect that an amount of a component remaining in cordierite formed by the firing is small and the obtained porous material can be constituted in such a manner as to have a higher porosity. It is to be noted that talc and the like may be combined/used as the Mg source to such an extent that the above-described effect produced by the use of $Mg(OH)_2$ and/or $MgCO_3$ is not substantially influenced.

Next, details of the method of manufacturing the porous material of the present invention will be described in accordance with one example of a manufacturing process.

In manufacturing the porous material of the present invention, first, the above-described cordierite forming material including the inorganic micro balloon containing $SiO_2$ and $Al_2O_3$ at the predetermined ratio, and an organic binder and water if necessary are added to the silicon carbide material, and mixed and kneaded to obtain a plastic clay. It is to be noted that a trace amount of impurities such as Fe, Al, and Ca are sometimes contained in the raw material for use, but the material may be used as such, or the material subjected to a chemical treatment such as chemical cleaning, and refined may be used.

A median particle diameter of the silicon carbide particle may be 10 to 50 μm as described above, and is preferably 20 to 40 μm. When the diameter is 10 μm or more, a desired porosity and pore diameter can be easily obtained. That is, cordierite has a property that the substance comparatively easily moves at the firing time, the porosity and pore diameter can be controlled without being largely influenced by a difference of the median particle diameter of the silicon carbide particles.

The connected structure containing silicon carbide and cordierite in the present invention has a mechanical strength equal to or more than that of recrystallized SiC. As a result, even in a state in which a silicon carbide group having a small median particle diameter is combined with cordierite in an elongated manner to form large pores, a thin-walled structure such as a honeycomb structure can be sufficiently maintained.

It is to be noted that the inorganic micro balloon to be added to and mixed with the silicon carbide material is used as the Al and Si sources of the cordierite forming material, but another material may be added as the Al source and/or the Si source. Examples of the Al source other than the inorganic micro balloon include a source containing one or both of aluminum oxide ($Al_2O_3$) and aluminum hydroxide ($Al(OH)_3$) because the impurities are few.

It is to be noted that, for example, in order to smoothly extrude/form the plastic clay, for example, into a honeycomb shape or the like, one or more types of organic binders are preferably added as a forming auxiliary agent by 2% by volume or more with respect to a main material (silicon carbide and cordierite). However, when the added amount exceeds 30% by volume, the porosity becomes excessively high after calcining, and strength shortage is sometimes caused. Examples of the organic binder include hydroxypropyl methyl cellulose, methyl cellulose, hydroxyethyl cellulose, carboxylmethyl cellulose, polyvinyl alcohol and the like. Examples of a dispersant include ethylene glycol, dextrin, fatty acid soap, polyalcohol and the like.

The obtained plastic clay is formed into a desired shape, for example, a honeycomb shape or the like by an appropriate forming method. The forming can be performed by an extrusion forming method, an injection forming method, a pressing forming method, a method of forming a ceramic material into a columnar shape and thereafter forming through-holes or the like, and above all the extrusion forming method is preferably performed in that continuous forming is facilitated, cordierite crystals are oriented, and lower thermal expansion can be obtained.

Next, after the obtained formed body is calcined to remove (degrease) the organic binder contained in the formed body, the firing is performed. The calcining is preferably carried out at a temperature lower than a temperature at which cordierite is molten. Concretely, the temperature may be once retained at a predetermined temperature of about 300 to 600° C., or the calcining may be performed at a lowered temperature rise rate of 50° C./h or less in a predetermined temperature range.

Concerning a method of once retaining the temperature at a predetermined temperature, the temperature may be retained at only one temperature level or at a plurality of temperature levels. Further in the retaining the temperature at the plurality of temperature levels, a retention time may be mutually equal or different. Similarly in a method of retarding the temperature rise rate, the rate may be retarded in a certain temperature division only or a plurality of divisions, and farther in the plurality of divisions, the rates may be equal or different.

A calcining atmosphere may be an oxidation atmosphere. However, when a large amount of organic binders are contained in the formed body, the binders and the like rapidly burn by oxygen during the calcining, and a formed body temperature is rapidly raised in some case. Therefore, the calcining is preferably performed in an inactive atmosphere of nitrogen, argon or the like to thereby suppress an unusual temperature rise of the formed body. This unusual temperature rise is especially preferably suppressed in a case where a raw material having a large coefficient of thermal expansion (vulnerable to thermal shock) is used. It is to be noted that, for example, when the added ratio of the organic binder is 20% by volume or more with respect to the main raw material, the calcining is preferably performed in the above-described inactive atmosphere.

The calcining and the following firing may be performed as separate steps in the same or separate furnace, or as a continuous step in the same furnace. The former is a preferable method in a case where the calcining and the firing are performed in different atmospheres, but the latter method is preferable from viewpoints of a total firing time, running cost of the further and the like.

Cordierite needs to be softened in order to obtain the tissue in which silicon carbide is combined with cordierite. Since a softening point of cordierite is about 1400° C., a firing temperature during the firing is preferably set at 1400° C. or more. Furthermore, an optimum calcining temperature is determined from a micro structure or characteristic value. Additionally, the melting point of cordierite is largely exceeded at a temperature exceeding 1500° C., firing shrinkage increases, it is difficult to obtain a desired micro structure, and the firing temperature is preferable at 1400 to 1500° C.

It is to be noted that in the manufacturing method using a re-crystallization process described in the above-described Japanese Patent Application Laid-Open No. 6-182228, since the silicon carbide particles combine with one another, a sintered body having a high thermal conductivity is obtained, but the sintering is performed by a mechanism of evaporation condensation as described above. Therefore, a firing temperature which is higher than that in the method of manufacturing the honeycomb structure of the present invention is required in order to evaporate silicon carbide. The firing needs to be performed at a high temperature of at least 1800° C. or more, usually 2000° C. or more in order to obtain a practically usable silicon carbide sintered body.

With regard to the atmosphere of the firing, a non-oxidizing atmosphere of nitrogen, argon or the like is preferable. It is to be noted that in the method of manufacturing the honeycomb structure of the present invention, characteristics deterioration by nitriding of the materials is not involved at the firing time, therefore expensive argon does not have to be especially used, inexpensive nitrogen is usable, and therefore manufacturing costs can be reduced.

The present invention will be more concretely described hereinafter in accordance with examples, but the present invention is not limited to these examples.

EXAMPLES 1 TO 10

Comparative Examples 1 to 7

Inorganic micro balloons indicating values shown in Table 1 with respect to a total content of $SiO_2$ and $Al_2O_3$, a total content of $Na_2O$ and $K_2O$, and a melting point, Mg sources shown in Table 1, and $Al_2O_3$ were fired, and blended at an amount ratio to form a cordierite composition, and a cordierite forming material was obtained. Silicon carbide having a value of a median particle diameter shown in Table 1 was added to the material in such a manner that a ratio (% by volume) of a content of silicon carbide with respect to a total content of cordierite and silicon carbide indicated the value shown in Table 1, and a raw material mixture was obtained. With respect to 100 parts by mass of the raw material mixture, 2 parts by mass of each of methyl cellulose and hydroxypropoxyl methyl cellulose, 0.5 part by mass of a fatty acid soap which was a surfactant, and an appropriate amount of water were added to obtain a clay. The clay was kneaded, and extruded/formed to form a honeycomb structure, and moisture was removed by dielectric drying and hot air drying. Thereafter, calcining was performed in a nitrogen gas at a maximum temperature of 1400° C. on conditions that a maximum temperature retention time was eight hours, and a porous material of a honeycomb structure was obtained (Examples 1 to 10, Comparative Examples 1 to 7).

It is to be noted that in Table 1, "the total content of $SiO_2$ and $Al_2O_3$" is a value measured by an agglomerated mass plus absorptiometry, and EDTA titration method in conformity to JIS M8853 (fire-resistant clay analysis method), and is a value corresponding to "a total content of Si and Al sources contained in the inorganic micro balloon at a time when the Si source is converted to $SiO_2$, and the Al source is converted to $Al_2O_3$". Moreover, "a total content of $Na_2O$ and $K_2O$" is a value measured by an atomic absorption spectrometry in conformity to JIS M8853 (fire-resistant clay analysis method), and is a value corresponding to "a total content of sodium and potassium compounds included in the inorganic micro balloon at a time when the sodium compound is converted to $Na_2O$, and the potassium compound is converted to $K_2O$".

Comparative Example 8

A porous material of a honeycomb structure was obtained by a method similar to that of each of Examples 1 to 8, Comparative Examples 1 to 7 except that kaolin was used instead of the inorganic micro balloon (Comparative Example 8).

Comparative Example 9

A porous material of a honeycomb structure was obtained by a method similar to that of each of Examples 1 to 10, Comparative Examples 1 to 7 except that silicon carbide was not used (Comparative Example 9).

Physical Property Value Evaluation

The following physical property values were measured with respect to obtained porous materials. Results are shown in Table 1.

[Porosity]: measured in Archimedes method.

[Median Pore Diameter]: A distribution (pore distribution) of pores having pore diameters of 10 nm to 200 μm was measured by a mercury porosimeter, and a median value was calculated.

[50 μm or Larger Pore Ratio]: A distribution (pore distribution) of pores having pore diameters of 10 nm to 200 μl was measured by a mercury porosimeter, and a ratio (50 μm or larger pore ratio) of a volume of pores each having a diameter of 50 μm or more with respect to a total volume of all the measured pores was calculated.

[Strength]: Four-point bending strengths at room temperature were measured in conformity to a method described in JIS R1601.

TABLE 1

| | Median particle diameter of silicon carbide (μm) | Content ratio of silicon carbide*[1] (vol %) | Inorganic micro balloon | | | Mg source | Porosity (%) | Median pore diameter (μm) | Ratio of 50 μm or larger pores*[2] (%) | Bending strength (MPa) |
|---|---|---|---|---|---|---|---|---|---|---|
| | | | Total content ratio (mass %) of $SiO_2$ and $Al_2O_3$ | Total content ratio (mass %) of $Na_2O$ and $K_2O$ | Melting point (° C.) | | | | | |
| Example 1 | 20 | 50 | 90 | 1 | 1500 | Talc | 52 | 29 | 9 | 22 |
| Example 2 | 20 | 50 | 95 | 2 | 1500 | Talc | 53 | 30 | 10 | 21 |
| Example 3 | 20 | 50 | 90 | 2 | 1400 | Talc | 50 | 28 | 10 | 24 |
| Example.4 | 20 | 50 | 98 | 0.5 | 1600 | Talc | 58 | 22 | 5 | 20 |
| Example 5 | 20 | 50 | 98 | 0.5 | 1600 | $Mg(OH)_2$ | 60 | 21 | 8 | 17 |
| Example 6 | 20 | 50 | 98 | 0.5 | 1600 | $MgCO_3$ | 59 | 20 | 10 | 15 |
| Example 7 | 10 | 50 | 98 | 0.5 | 1600 | $Mg(OH)_2$ | 56 | 15 | 4 | 9 |
| Example 8 | 50 | 50 | 98 | 0.5 | 1600 | $Mg(OH)_2$ | 55 | 29 | 9 | 8 |
| Example 9 | 20 | 5 | 98 | 0.5 | 1600 | $Mg(OH)_2$ | 65 | 15 | 5 | 7 |
| Example 10 | 20 | 70 | 98 | 0.5 | 1600 | $Mg(OH)_2$ | 60 | 10 | 10 | 9 |
| Comparative example 1 | 20 | 50 | 89 | 1 | 1450 | Talc | —*[3] | —*[3] | —*[3] | —*[3] |
| Comparative example 2 | 20 | 50 | 95 | 2.5 | 1450 | Talc | —*[3] | —*[3] | —*[3] | —*[3] |
| Comparative example 3 | 20 | 50 | 90 | 2.5 | 1350 | Talc | —*[3] | —*[3] | —*[3] | —*[3] |
| Comparative example 4 | 8 | 50 | 98 | 0.5 | 1600 | $Mg(OH)_2$ | 56 | 7 | 4 | 20 |
| Comparative example 5 | 55 | 50 | 98 | 0.5 | 1600 | $Mg(OH)_2$ | 57 | 35 | 20 | 4 |
| Comparative example 6 | 20 | 3 | 98 | 0.5 | 1600 | $Mg(OH)_2$ | 63 | 20 | 8 | 3 |
| Comparative example 7 | 20 | 75 | 98 | 0.5 | 1600 | $Mg(OH)_2$ | 61 | 5 | 12 | 3 |
| Comparative example 8 | 20 | 50 | — | — | — | Talc | 40 | 7 | 9 | 43 |
| Comparative example 9 | — | — | 98 | 0.5 | 1600 | $Mg(OH)_2$ | 62 | 30 | 10 | 3 |

*[1]Ratio of content of silicon carbide to total content of cordierite and silicon carbide
*[2]Ratio of volume of pores each having diameter of 50 μm or more with respect to total volume of pores
*[3]No data (molten at firing time)

As apparent from the results shown in Table 1, it has been found that in a case where the inorganic micro balloon containing $SiO_2$ and $Al_2O_3$ is used as a part of the Al and Si sources included in the cordierite forming material (Examples 1 to 10), it is possible to manufacture a porous material having a high porosity (50% or more) as compared with a case where the balloon is not used (Comparative Example 8). It has been found that the inorganic micro balloon is molten at a firing time when using the inorganic micro balloon in which the total content of $SiO_2$ and $Al_2O_3$ is less than 90% by mass, and/or the total content of $Na_2O$ and $K_2O$ exceeds 2% by mass (Comparative Examples 1 to 3).

Furthermore, it can be confirmed that the 50 μm or larger pore ratio and the bending strength do not fall within desired numeric value ranges in a case where the median particle diameter of silicon carbide is less than 10 μm (Comparative Example 4) or exceeds 50 μm (Comparative Example 5). It has also been found that the porous materials of the examples have larger bending strength values and are superior in mechanical strength as compared with the porous materials in which silicon carbide containing ratio is less than 5% by volume (Comparative Example 6) and exceeds 70% by volume (Comparative Example 7). It is to be noted that it has been found that the porous materials of the examples in which the connected structure containing silicon carbide is formed have larger bending strength values and exhibit superior mechanical strengths as compared with the porous material which does not contain silicon carbide in the form of aggregate particles and which is formed only of cordierite (Comparative Example 9).

INDUSTRIAL APPLICABILITY

As described above, a porous material of the present invention is a porous material having a high porosity and a high strength and having a remarkably low possibility of including defective portions such as cuts and the like causing liquid leakage in a case where the material is used as a filter, because the porosity and median particle diameter are in predetermined numeric value ranges. In a method of manufacturing a porous material of the present invention, an inorganic micro balloon containing $SiO_2$ and $Al_2O_3$ is used as a part or all of Al and Si sources included in a cordierite forming material. Therefore, there is an advantage that there is a remarkably low possibility of generating disadvantages such as cuts and the like causing liquid leakage in the obtained porous material, and a high-porosity porous material having preferable characteristics can be manufactured as a material constituting a filter, a catalyst carrier or the like mainly for purifying an automobile exhaust gas.

What is claimed:

1. A method of manufacturing a porous material comprising:
    providing silicon carbide particles and a cordierite forming material containing an Al source, an Si source, and an Mg source to form a mixture; and
    forming cordierite by firing the mixture;
    wherein inorganic microballoons containing $SiO_2$ and $Al_2O_3$ define part or all of the Al source and the Si source;
    wherein a total content of the Si source and the Al source contained in the inorganic microballoons with respect to a total content of the inorganic microballoons is 95 mass % or more when the Si source is converted to $SiO_2$ and the Al source is converted to $Al_2O_3$; and
    wherein a total content of a sodium compound and a potassium compound contained in the inorganic microballoons with respect to the total content of the inorganic microballoons is 2 mass % or less when the sodium compound is converted to $Na_2O$ and the potassium compound is converted to $K_2O$.

2. The method of manufacturing the porous material according to claim 1, wherein a melting point of the inorganic microballoons is 1400° C. or more.

3. The method of manufacturing the porous material according to claim 1, wherein $Mg(OH)_2$ and/or $MgCO_3$ is used as a part or all of the Mg source.

4. The method of manufacturing the porous material according to claim 1, wherein the silicon carbide particles are spherical, and have a median particle diameter of 10 to 50 μm.

* * * * *